United States Patent
Sokoll

(10) Patent No.: US 9,020,725 B2
(45) Date of Patent: Apr. 28, 2015

(54) BRAKE CONTROL SYSTEM AND METHOD FOR MOTOR VEHICLES

(75) Inventor: Guenther Sokoll, Olching (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 2212 days.

(21) Appl. No.: 12/027,673

(22) Filed: Feb. 7, 2008

(65) Prior Publication Data

US 2008/0195289 A1 Aug. 14, 2008

(30) Foreign Application Priority Data

Feb. 10, 2007 (DE) .......................... 10 2007 006 700

(51) Int. Cl.
*B60T 8/26* (2006.01)
*B60T 7/12* (2006.01)

(52) U.S. Cl.
CPC ............ B60T 7/122 (2013.01); *B60T 2201/06* (2013.01); *B60T 2230/04* (2013.01)

(58) Field of Classification Search
USPC .............. 701/29, 32, 70, 79, 83, 110, 66; 340/903; 192/219
See application file for complete search history.

(56) References Cited

U.S. PATENT DOCUMENTS

| | | | |
|---|---|---|---|
| 4,685,745 A * | 8/1987 | Reinecke | 303/191 |
| 5,979,619 A | 11/1999 | Rump | |
| 6,315,372 B1 | 11/2001 | Kroeger et al. | |
| 6,378,957 B1 * | 4/2002 | V.ang.gstedt | 303/9.62 |
| 6,439,675 B1 | 8/2002 | Zechmann et al. | |
| 6,814,414 B1 | 11/2004 | Schmitt et al. | |
| 7,665,808 B2 * | 2/2010 | Deprez et al. | 303/192 |
| 7,744,166 B2 * | 6/2010 | Leiter et al. | 303/20 |
| 2006/0238020 A1 * | 10/2006 | Nitta et al. | 303/113.1 |

FOREIGN PATENT DOCUMENTS

| | | |
|---|---|---|
| DE | 196 11 359 C1 | 8/1997 |
| DE | 199 41 482 A1 | 4/2000 |
| DE | 198 48 448 C2 | 6/2000 |
| DE | 199 50 034 A1 | 4/2001 |
| DE | 199 50 162 B4 | 5/2001 |
| DE | 101 61 846 B4 | 5/2002 |
| DE | 10 2005 061 123 A1 | 7/2006 |
| WO | WO 2006/013174 A1 | 2/2006 |

OTHER PUBLICATIONS

German Search Report dated Jun. 6, 2007 with an English translation of the pertinent portions (Nine (9) pages).

* cited by examiner

*Primary Examiner* — Adam Tissot
(74) *Attorney, Agent, or Firm* — Crowell & Moring LLP

(57) ABSTRACT

A brake control system and method for motor vehicles is provided with an electronic control unit, by which, when the motor vehicle is stationary, a parking brake function can be activated manually or automatically. Its deactivation occurs upon reaching a predefined release condition. In the presence of a release condition the brake pressure, which was built up for the parking brake function, is released in a time offset manner at least in relation to the axles of the vehicle by way of the control unit.

19 Claims, 1 Drawing Sheet

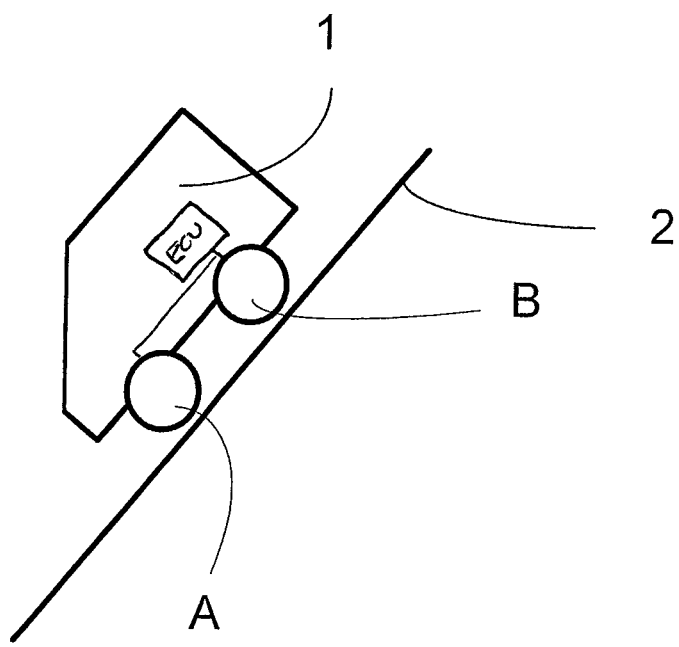

BRAKE CONTROL SYSTEM AND METHOD FOR MOTOR VEHICLES

CROSS REFERENCE TO RELATED APPLICATIONS

This application claims priority under 35 U.S.C. §119 to German Patent Application No. 102007006700.5, filed Feb. 10, 2007, the entire disclosure of which is expressly incorporated by reference.

BACKGROUND AND SUMMARY OF THE INVENTION

The invention relates to a brake control system and method for motor vehicles with an electronic control unit, by which, when the motor vehicle is stationary, a parking brake function can be activated manually or automatically. Deactivation of the parking brake function occurs upon reaching a predefined release condition.

A plethora of various patent applications or patent documents, such as DE 199 50 034 A1, DE 196 11 359 C1, DE 199 50 162 B4, DE 198 48 448 C2, DE 101 51 846 B4, DE 199 41 482 A1, etc., disclose methods and devices that are supposed to prevent vehicles from rolling away—in particular, but not necessarily, on slopes. Therefore, in at least one operating state upon actuating the brake pedal or by use of another operating control element, a braking force is usually held, or actively built-up, at least at one wheel of a vehicle as a function or independently of, the magnitude associated with operating the pedal or the other operating control element. In order to activate or deactivate the function, various conditions for fulfillment or initiation are provided as a common feature or as an alternative.

These methods or devices exist, for example, under the names start assistant, hill start assistant, hill hold(er) or automatic hold. In summary, these methods are referred to below as automatic parking brake functions. The common feature of all of these automatic parking brake functions is, for example, a hydraulic, mechanical, electro-hydraulic, electro-mechanical, or pneumatic brake system that can be controlled electronically and with which the vehicle can be held stationary or can be prevented from rolling away. There also exist methods that prevent the vehicle from rolling away by use of the transmission (in particular, an automatic transmission). In all of these functions, the activation of the function is performed, for example, by actuating the brake pedal or the hand brake or by means of the shift elements, which are connected to the brake pedal or hand brake, or any other operator control elements (for example, switches, push buttons, and the like). A deactivation is performed by means of the same or other auxiliary tools (such as the gas pedal position, coupling signal, drive torque signals of the engine, and the like, or also following passage of a defined holding period).

Other important necessary auxiliary tools, control signals or switching devices for carrying out the automatic parking brake functions are, for example, usually one speed signal (or a plurality of speed signals) for the detection of the vehicle standstill; mechanical, pneumatic or hydraulic actuators (in principle, electro-hydraulic, electro-pneumatic or electric actuators could also be used) in the wheel brakes or in the feed lines to the wheel brakes, by which the braking effect can be increased or decreased or at least held temporarily (for example, control/adjusting valves integrated in the form of an existing control or adjusting device, for example, ABS, ASC/ASR, DSC/ESP/EHB system); optionally, also longitudinal acceleration or tilt sensors, by which the longitudinal slope or grade of the road is determined and from that the necessary braking force for a secure standstill of the vehicle and the starting torque, which is necessary for the grade of the road, can be determined; and one pressure sensor (or a plurality of pressure sensors), by which the brake pressure or the generated brake torque at the wheel brake(s) can be determined.

The invention improves upon the transition from a parking brake function into a start operation.

According to the invention, a brake control system and method for a motor vehicle is provided. The brake control system has an electronic control unit, by which, when the motor vehicle is stationary, a parking brake function can be activated manually or automatically. Deactivation of the parking brake function occurs upon reaching a predefined release condition. In the presence of a release condition, the brake pressure, which was built-up for the parking brake function, is released in a time offset manner at least in relation to the axle by way of the control unit. The time offset manner could be, for example, a phase or amplitude offset. Advantageous further developments of the invention are described and claimed herein.

The present invention is based on the following additional knowledge. An uncomfortable behavior when starting a vehicle from a full stop can occur with the prior art methods and devices (in particular, in connection with the aforementioned brake systems) in the following situations:

When decelerating the vehicle on a downhill descent out of the drive mode as far as to a full stop of the vehicle, stress and strains are generated, for example, as a function of the construction of the vehicle, the chassis and/or the brake system. In principle, the greater the road ascent and, thus, the slope descending force and the greater the delay and the stopping jolt until reaching the standstill, then the higher these stresses are. In particular, it must be pointed out that the stresses at the axles of the vehicle can increase to varying degrees owing to the varying elasticity. With a change in the desired direction of travel that takes place after the vehicle has been at a standstill (e.g., detectable by way of a gear change) and when starting from the hill-hold function (for example, start assistant, automatic hold, ACC stop and go, park maneuvering assistant), the practice to date has been, according to the prior art, to release the brake torque at the wheel brakes simultaneously with an adequate drive torque (for example, brake pressure decreased at all four wheels), so that the vehicle can be put into motion.

As a result, stresses of varying magnitude are released at the vehicle axles; and partially negative acoustical stress relief noises and driving comfort-sided effects (release and/or starting jerks, no homogeneous and uniform release and starting behavior, "wind-up effect") occur.

When driving forward downhill, as well as when braking in the standstill and subsequently changing the direction of travel (backwards uphill), the invention proposes, for example, that a start assistant or another system with a parking brake function no longer release the brake pressure simultaneously at the wheel brakes.

The procedure will also be the same when decelerating into the standstill, when the vehicle is standing backwards downhill and then there is an abrupt change in the direction of travel, and when the vehicle starts up from a full stop and travels forward uphill.

Therefore, the inventive method includes the following measures. When the brake torque is released axle-wise (slightly) time-offset (for example, phase offset or amplitude offset), in that the axle experiences (as a function of the construction of the vehicle, as is well known) the higher stresses in the respective driving situation (dependent on the direction of travel, that is, the vehicle is standing forwards or backwards downhill), the brake torque decrease is started at an early stage at the wheel brakes of the other axles. The premature release of the brake torque at an axle can take place suddenly or linearly (in a ramp-like fashion) or according to another functionality. Even a stepped release to one or more temporary intermediate holding torque levels (holding pressure levels) with a subsequently additional holding torque decrease is also contemplated.

The premature decrease in the brake torque at the wheel brakes of the one axle or its time advancement compared to the decrease in the other axle can be, for example, dependent one or more of several factors, such as: (a) dependent on the ascent of the road, (b) dependent on the brake delay, which occurs upon stopping, in the standstill, (c) dependent on the brake jerk, which occurs upon stopping, (d) dependent on the brake torque level (dependent on the brake holding pressure level), (e) dependent on the vehicle mass or load (dependent on the trailer), (f) dependent on the brake temperature, (g) dependent on the brake wear and tear, (h) dependent on the driving pedal, and/or the driving pedal gradient, (i) dependent on the drive torque and/or the drive torque gradient, and (j) dependent on the engine speed and/or the engine speed gradient. Other dependencies are contemplated as well, for example, dependent on the gear steps or dependent on the drive train gear ratio.

In the event of a detected so-called "μ-split lane" (ratios of the coefficient of friction that vary as a function of the side of the vehicle), it is contemplated that the brake torque decrease may vary for the selected wheel or for the selected side.

The invention achieves a significant, perceptible, and audible improvement in the starting comfort with respect to a parking brake function on slopes in the event of a preceding change in the direction of travel (avoidance/reduction in the acoustical impairments and an improvement and/or increase in the starting comfort, i.e., jolt-free starting from a full stop) due to a brake torque release that is time offset for the selected axle.

Other objects, advantages and novel features of the present invention will become apparent from the following detailed description of the invention when considered in conjunction with the accompanying drawing.

BRIEF DESCRIPTION OF THE DRAWING

The single FIGURE illustrates an embodiment of the invention.

DETAILED DESCRIPTION OF THE DRAWING

The single FIGURE shows a motor vehicle 1, which has come to a standstill in the forward direction on an inclined lane 2. If, after an automatically activated parking brake function, the motor vehicle starts up again in the opposite direction (thus, in this case, travels backwards uphill), the wheel brake pressure is released and/or decreased, according to the invention, at first at the wheels of the front axle A and then time-offset at the wheels of the rear axle B by way of the electronic control unit (which is not illustrated here in detail) and the associated controllable hydraulics of a conventional vehicle brake system.

The brake pressure is released advantageously time offset in such a manner only if the vehicle has come to a standstill on an inclined road and if the vehicle has come to a standstill with a predefined minimum delay. This is checked by the control unit, for example, by way of a longitudinal acceleration or tilt sensor or, for example, as an alternative by way of the sensed wheel speed signals and/or the calculated wheel and/or vehicle acceleration signals. Furthermore, the brake pressure is released in such a manner time offset in relation to the axles, only if after a standstill the vehicle changes the direction of travel based on the direction of travel before the standstill, as described in the embodiment.

In general, the control unit can also retrieve other operating parameters that indicate whether and at which axle the stresses are higher owing to the preceding deceleration operation.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A brake control system for a motor vehicle, comprising:
   an electronic control unit operably configured to perform a parking brake function, wherein when the motor vehicle is stationary, the parking brake function is activable manually or automatically; and
   wherein upon reaching a predefined release condition of the parking brake function, the electronic control unit controls a release of a brake pressure, which was built-up for the parking brake function, in a time offset manner as between at least a first axle and a second axle of the motor vehicle, such that the brake pressure is released initially at wheels of the first axle and then time-offset at wheels of the second axle.

2. The brake control system according to claim 1, wherein the time offset manner is at least one of a phase offset and an amplitude offset.

3. The brake control system according to claim 2, wherein the brake pressure is released time offset at least as between the at least first axle and the second axle only if the motor vehicle has come to a standstill on an inclined surface.

4. The brake control system according to claim 1, wherein the brake pressure is released time offset at least as between the at least first axle and the second axle only if the vehicle is in a standstill for a predefined minimum delay.

5. The brake control system according to claim 3, wherein the brake pressure is released time offset at least as between the at least first axle and the second axle only if the vehicle is in a standstill for a predefined minimum delay.

6. The brake control system according to claim 1, wherein the brake pressure is released time offset at least as between the at least first axle and the second axle only if, after the vehicle has come to a standstill, the vehicle changes a direction of travel based on the direction of travel prior to the standstill.

7. The brake control system according to claim 3, wherein the brake pressure is released time offset at least as between the at least first axle and the second axle only if, after the vehicle has come to a standstill, the vehicle changes a direction of travel based on the direction of travel prior to the standstill.

8. The brake control system according to claim 4, wherein the brake pressure is released time offset at least as between the at least first axle and the second axle only if, after the vehicle has come to a standstill, the vehicle changes a direction of travel based on the direction of travel prior to the standstill.

9. The brake control system according to claim 1, wherein the brake pressure is released initially at wheels of the first axle at which a stress was higher than at the wheels of the second axle due to a preceding deceleration operation.

10. The brake control system according to claim 3, wherein the brake pressure is released initially at wheels of the first axle at which a stress was higher than at the wheels of the second axle due to a preceding deceleration operation.

11. The brake control system according to claim 4, wherein the brake pressure is released initially at wheels of the first axle at which a stress was higher than at the wheels of the second axle due to a preceding deceleration operation.

12. The brake control system according to claim 6, wherein the brake pressure is released initially at wheels of the first axle at which a stress was higher than at the wheels of the second axle to a preceding deceleration operation.

13. The brake control system according to claim 1, wherein the brake pressure is released time offset as between the at least first axle and the second axle additionally as a function of one of a coefficient of friction and a frictional connection.

14. A method of operating a brake control system for a motor vehicle, the method comprising the acts of:
    activating a parking brake function of the motor vehicle when the motor vehicle is stationary, the parking brake function being deactivatable upon reaching a predefined release condition; and
    upon reaching the predefined release condition, releasing a brake pressure built-up for the parking brake function in a time offset manner as between at least a first axle and a second axle of the vehicle, such that the brake pressure is released initially at wheels of the first axle and then time-offset at wheels of the second axle.

15. The method according to claim 14, wherein the act of releasing the brake pressure occurs in the time-offset manner as between the at least first axle and the second axle only if the vehicle comes to a standstill on an inclined surface.

16. The method according to claim 15, wherein the release of the brake pressure in the time-offset manner as between the at least first axle and the second axle additionally requires that the vehicle is in a standstill for a predefined minimum delay.

17. The method according to claim 15, wherein the release of the brake pressure occurs in the time-offset manner as between the at least first axle and the second axle only if, after the vehicle has come to the standstill, the vehicle changes a direction of travel from the direction of travel prior to the standstill.

18. The method according to claim 15, wherein the release of the brake pressure occurs initially at wheels of the first axle at which a stress due to a preceding deceleration operation to the standstill was higher than at the wheels of the second axle.

19. The method according to claim 15, wherein the release of the brake pressure occurs in the time-offset manner as between the at least first axle and the second axle as a function of a coefficient of friction.

\* \* \* \* \*